United States Patent
Matoba et al.

(10) Patent No.: US 9,207,526 B2
(45) Date of Patent: Dec. 8, 2015

(54) PROJECT TYPE VIDEO DISPLAY HAVING A PLURALITY OF LIGHT SOURCES AND A CONTROLLER ROTATING AN ACTIVE GROUP OF THE PLURALITY OF LIGHT SOURCES

(71) Applicants: Takashi Matoba, Tokyo (JP); Yoshinori Asamura, Tokyo (JP); Isao Yoneoka, Tokyo (JP)

(72) Inventors: Takashi Matoba, Tokyo (JP); Yoshinori Asamura, Tokyo (JP); Isao Yoneoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 91 days.

(21) Appl. No.: 13/717,330

(22) Filed: Dec. 17, 2012

(65) Prior Publication Data

US 2013/0215334 A1 Aug. 22, 2013

(30) Foreign Application Priority Data

Feb. 16, 2012 (JP) ................ 2012-031267

(51) Int. Cl.
G03B 21/20 (2006.01)
H04N 9/31 (2006.01)

(52) U.S. Cl.
CPC .......... *G03B 21/2053* (2013.01); *G03B 21/206* (2013.01); *G03B 21/2033* (2013.01); *H04N 9/3155* (2013.01); *H04N 9/3111* (2013.01); *H04N 9/3158* (2013.01)

(58) Field of Classification Search
CPC ............... G03B 21/20; G03B 21/2033; G03B 21/2053; G03B 21/206; H04N 9/31; H04N 9/3155; H04N 9/3164; H04N 9/3111; H05B 37/03; H05B 37/032; H05B 37/034; H05B 37/036; H05B 37/038; H05B 37/04
USPC .............. 353/30–31, 85, 94; 362/84–85, 227, 362/230–231, 236, 249.02–249.03, 259, 362/800; 315/121, 294, 312, 317, 360
See application file for complete search history.

(56) References Cited

U.S. PATENT DOCUMENTS

| 7,019,736 | B2 * | 3/2006 | Allen et al. .................... 345/207 |
| 7,052,138 | B2 * | 5/2006 | Matsui ............................ 353/31 |
| 7,425,943 | B2 * | 9/2008 | Furukawa ...................... 345/102 |
| 7,607,784 | B2 * | 10/2009 | Shimaoka et al. .............. 353/85 |
| 7,969,640 | B2 * | 6/2011 | Arai et al. ..................... 359/290 |
| 8,021,001 | B2 * | 9/2011 | Iwanaga ......................... 353/85 |
| 8,199,401 | B2 * | 6/2012 | Ninan et al. .................. 359/443 |

(Continued)

FOREIGN PATENT DOCUMENTS

| CN | 1832581 A | 9/2006 |
| CN | 101278558 A | 10/2008 |

(Continued)

*Primary Examiner* — Jori S Reilly-Daikun
(74) *Attorney, Agent, or Firm* — Birch, Stewart, Kolasch & Birch, LLP

(57) ABSTRACT

A projection type video display includes a light source including light source parts, which are the LED arrays each including six LEDs, for every predetermined colors; a light source controller time-division driving each of the light source parts at a timing based on an input video signal to be input from the outside; and a video display device modulating light emitted from each of the light source parts based on the input video signal and projecting the modulated light onto a screen, wherein the light source controller controls only three LEDs among the six LEDs to turn on in each driving of the time-division driving of each of the light source parts.

2 Claims, 7 Drawing Sheets

(56) References Cited

U.S. PATENT DOCUMENTS

| | | | |
|---|---|---|---|
| 8,274,237 B2* | 9/2012 | Nagase et al. | 315/247 |
| 8,408,719 B2* | 4/2013 | Shibasaki | 353/94 |
| 8,684,539 B2* | 4/2014 | Suzuki | 353/85 |
| 8,687,271 B2* | 4/2014 | Ninan | 359/443 |
| 2004/0036668 A1* | 2/2004 | Nakanishi | 345/88 |
| 2005/0041000 A1* | 2/2005 | Plut | 345/39 |
| 2006/0170883 A1* | 8/2006 | Matsui | 353/85 |
| 2006/0215124 A1* | 9/2006 | Seo | 353/52 |
| 2007/0035707 A1* | 2/2007 | Margulis | 353/122 |
| 2007/0046898 A1 | 3/2007 | Conner | |
| 2008/0316439 A1 | 12/2008 | Conner | |
| 2009/0096741 A1* | 4/2009 | Kim | 345/102 |
| 2010/0079730 A1* | 4/2010 | Shibasaki | 353/31 |
| 2010/0220297 A1 | 9/2010 | Conner | |
| 2010/0283720 A1 | 11/2010 | Segawa et al. | |
| 2011/0006689 A1* | 1/2011 | Blanchard et al. | 315/121 |
| 2013/0099670 A1* | 4/2013 | Jin | 315/120 |
| 2013/0250247 A1* | 9/2013 | Kase | 353/30 |
| 2013/0265056 A1* | 10/2013 | Lin | 324/414 |

FOREIGN PATENT DOCUMENTS

| | | |
|---|---|---|
| JP | 2005-331706 A | 12/2005 |
| JP | 2007-163973 A | 6/2007 |
| JP | 2007-272114 A | 10/2007 |
| JP | 2009-152540 A | 7/2009 |
| JP | 2009-271408 A | 11/2009 |
| JP | 2011-216679 A | 10/2011 |
| JP | 2013-057786 A | 3/2013 |
| WO | 2009/118975 A1 | 10/2009 |

* cited by examiner

F I G. 1
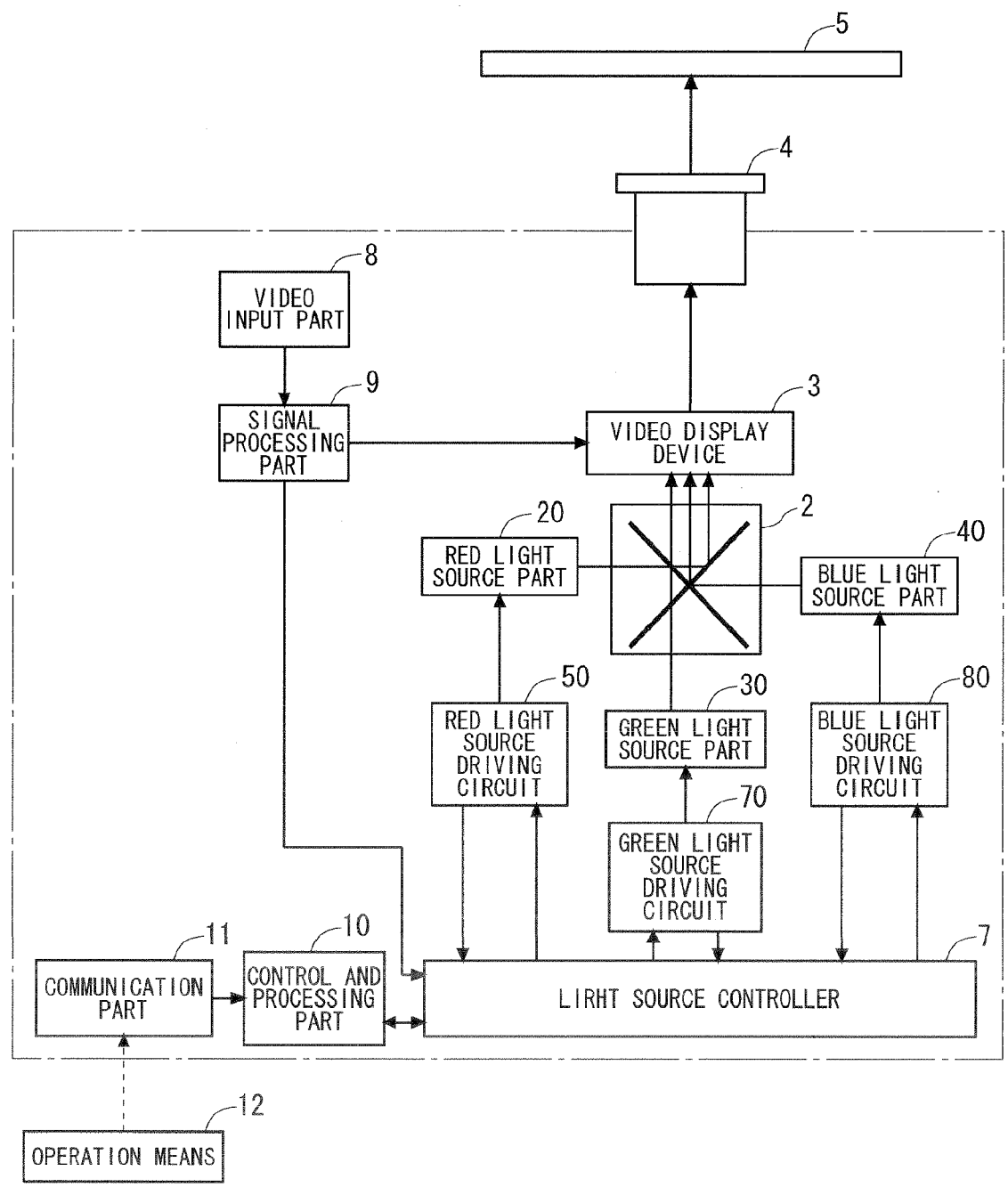

PROJECT TYPE VIDEO DISPLAY HAVING A PLURALITY OF LIGHT SOURCES AND A CONTROLLER ROTATING AN ACTIVE GROUP OF THE PLURALITY OF LIGHT SOURCES

BACKGROUND OF THE INVENTION

1. Field of the Invention

The present invention relates to a projection type video display including an LED array composed of a plurality of LEDs as a light source.

2. Description of the Background Art

Nowadays, a light source composed of light emitting diodes (hereinafter, referred to as "LEDs") is being used in place of a conventional lamp light source in a projection type video display. In particular, in a digital light processing (DLP, registered trademark) video display that includes a digital micromirror device (DMD), LEDs emitting red light, LEDs emitting green light, and LEDs emitting blue light are used, and the LEDs of three colors are sequentially turned on (for example, see Japanese Patent Application Laid-Open No. 2005-331705). One example of such a projection type video display includes an LED array composed of a plurality of LEDs as a light source for higher brightness. Hereinbelow, an LED array emitting red light is referred to as an R-LED array, an LED array emitting green light is referred to as a G-LED array, and an LED array emitting blue light is referred to as a B-LED array. In the above-mentioned projection type video display, a drive circuit is provided for every LEDs constituting an LED array or every a plurality of groups. Specifically, for example, an R-LED array is composed of six LEDs and a drive circuit is provided for every three groups each of which is composed of two LEDs.

In the above-mentioned video display, input video signals are converted into pieces of digital data of respective colors, that is, into red data (hereinbelow, referred to as "R data"), green data (hereinbelow, referred to as "G data"), and blue data (hereinbelow, referred to as "B data"), and the DMD is driven in accordance with the pieces of data of respective colors, whereby light beams of three colors are subjected to intensity modulation. That is, the red light is subjected to intensity modulation in accordance with the R data, the green light is subjected to intensity modulation in accordance with the G data, and the blue light is subjected to intensity modulation in accordance with the B data. The light beams of three colors subjected to intensity modulation are projected onto, for example, a screen through light combining means and a projection lens, so that a video image appears.

In a case where, for example, one LED in the R-LED array fails and cannot turn on in the above-mentioned video display, the drive circuit of the LED that has failed stops driving the LED. In this case, the chromaticity and brightness of a video image to be projected onto a screen change upon a reduction in brightness of red. In particular, in a multivision projection type video display formed through the combination of a plurality of projection type video displays, changes in chromaticity and brightness of a video image projected by a projection type video display may impair uniformity and unity among a plurality of screens.

SUMMARY OF THE INVENTION

An object of the present invention is to provide a projection type video display capable of suppressing changes in chromaticity and brightness of a video image even in a case where an LED of an LED array fails.

A projection type video display according to the present invention includes: a light source including LED arrays for every predetermined colors, the LED arrays each including m (m is an integer equal to or larger than two) LEDs; a light source controller time-division driving each of the LED arrays at a timing based on an input video signal to be input from the outside; and a video display device modulating the light emitted from each of the LED arrays based on the input video signal and projecting the modulated light onto a screen. The light source controller controls only n (n is an integer smaller than m) LEDs among the m LEDs to turn on in each driving of the time-division driving of each of the LED arrays.

According to the present invention, the light source controller controls only n LEDs among m LEDs to turn on in each driving of the time-division driving of each LED array, and thus, the number of LEDs to turn on can remain unchanged between before and after a failure of an LED in the LED array. This enables to suppress, even in a case where an LED in an LED array fails, changes in chromaticity and brightness of a video image between before and after the failure of the LED.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a configuration diagram of a projection type video display according to a preferred embodiment;

DESCRIPTION OF THE PREFERRED EMBODIMENT

<Preferred Embodiment>

Figure 2:
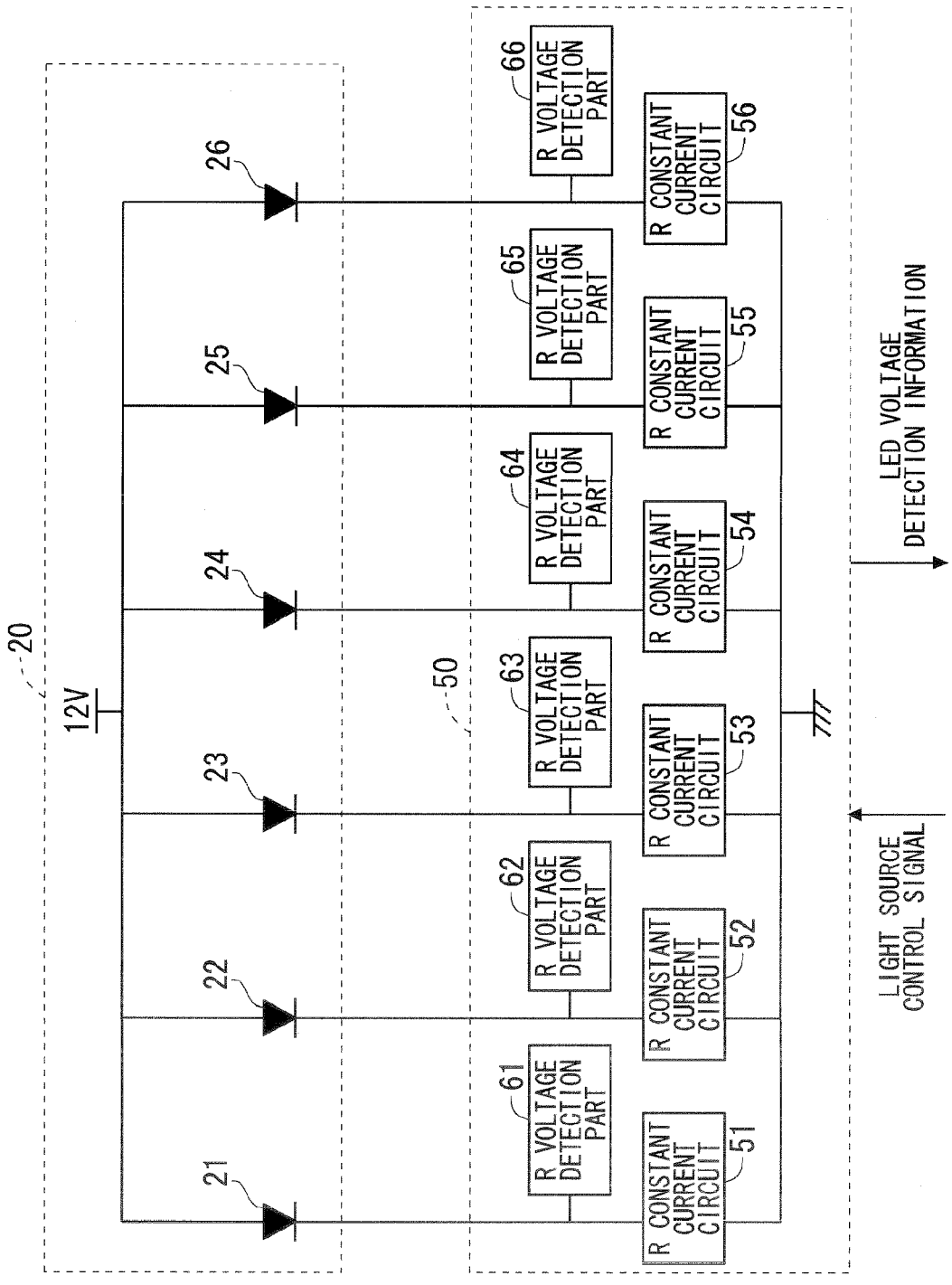
FIG. 2 is a configuration diagram of a red light source part and a red light source driving circuit.

A preferred embodiment of the present invention is described below with reference to the drawings.

<Configuration of Projection Type Display>

FIG. 1 is a configuration diagram of a projection type video display according to the preferred embodiment. The projection type video display includes a red light source part 20, a green light source part 30, a blue light source part 40, a video display device 3, a red light source driving circuit 50, a green light source driving circuit 70, a blue light source driving circuit 80, a light source controller 7, a light combining part 2, a projection lens 4, a screen 5, a video input part 8, a signal processing part 9, a control and processing part 10, a communication part 11, and operation means 12.

Figure 3:
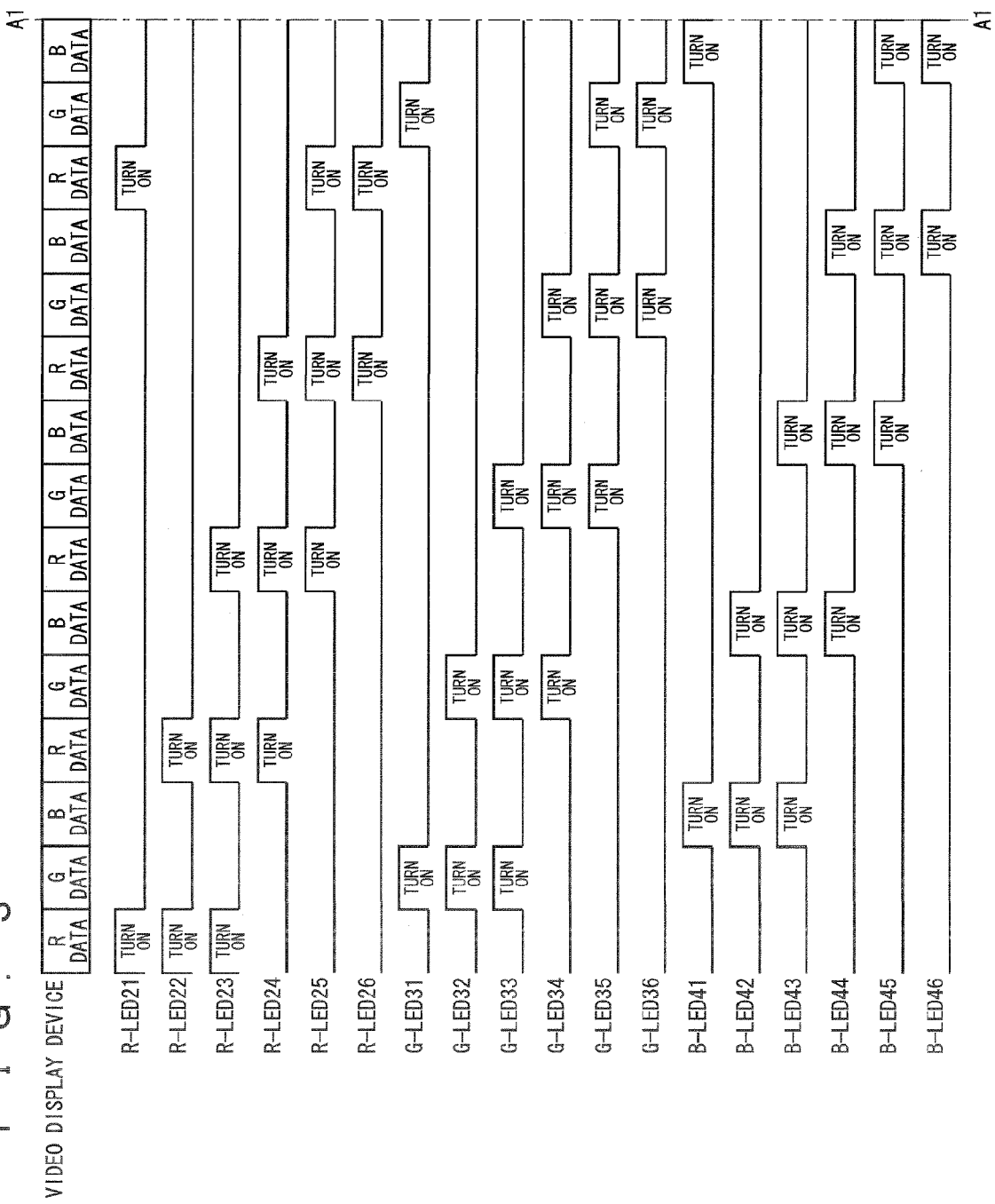
FIG. 3 is a part of a timing chart showing turn-on timings of LEDs in a normal state in a power saving mode.

The red light source part 20 is formed of a light emitting diode array that emits red (R) light, which is composed of six (more generally, m) light emitting diodes emitting red (R) light (hereinbelow, referred to as "R-LEDs") 21 to 26 (see FIGS. 2 and 3). The green light source part 30 is formed of a light emitting diode array that emits green (G) light, which is composed of six (more generally, m) light emitting diodes emitting green (G) light (hereinbelow, referred to as "G-LEDs") 31 to 36 (see FIG. 3). The blue light source part 40 is formed of a light emitting diode array that emits blue (B) light, which is composed of six (more generally, m) light emitting diodes emitting blue (B) light (hereinbelow, referred to as "B-LEDs") 41 to 46 (see FIG. 3). Hereinbelow, a light emitting diode array of each color is referred to as an "LED array". The light emitted from the red light source part 20, the light emitted from the green light source part 30, and the light emitted from the blue light source part 40 enter the video display device 3 through the light combining part 2 formed of a dichroic mirror. The red light source part 20, the green light source part 30, and the blue light source part 40 correspond to a light source.

The video input part 8 outputs an input video signal input from the outside to the signal processing part 9. The signal processing part 9 converts the input video signal input through the video input part 8 into video data in a format required for the video display device 3 and then outputs the video data to the video display device 3.

The red light source driving circuit 50, the green light source driving circuit 70, and the blue light source driving circuit 80 supply drive currents to the red light source part 20, the green light source part 30, and the blue light source part 40, respectively, based on light source control signals from the light source controller 7, to thereby drive the red light source part 20, the green light source part 30, and the blue light source part 40, respectively.

Next, the configuration of the red light source driving circuit 50 is described. The red light source driving circuit 50, the green light source driving circuit 70, and the blue light source driving circuit 80 have the same configuration, and thus, only the red light source driving circuit 50 is described here. FIG. 2 is a configuration diagram of the red light source part 20 and the red light source driving circuit 50. The red light source part 20 is formed of an LED array as described above, and a constant current circuit is illustrated as a light source driving circuit for the LED array. The red light source driving circuit 50 is composed of R constant current circuits 51 to 56 that supply drive currents to the R-LEDs 21 to 26 constituting the red light source part 20, and R voltage detection parts 61 to 66 that detect voltage drops by the R-LEDs 21 to 26.

The R constant current circuits 51 to 56 supply drive currents to the R-LEDs 21 to 26 based on the light source control signals output from the light source controller 7. The R voltage detection parts 61 to 66 detect voltage drops caused in the R-LEDs 21 to 26 and output the detection results to the control and processing part 10 through the light source controller 7 as the LED voltage detection information.

The light source controller 7 controls only three (n) LEDs among the six LEDs to turn on in each driving of time-division driving of each of the light source parts 20, 30, and 40. More specifically, the light source controller 7 outputs the light source control signals to the light source driving circuits 50, 70, and 80 based on the timing at which the signal processing part 9 inputs video data to the video display device 3 and based on the control by the control and processing part 10, to thereby control the turn-on timing and a supply current of each LED.

In addition, the light source controller 7 outputs pieces of LED voltage detection information input from the R voltage detection parts 61 to 66, G voltage detection parts (not shown), and B voltage detection parts (not shown) to the control and processing part 10.

The operation means 12 is formed as a remote control or an external computer, and sets an operation mode of the projection type video display upon operation by a user.

The control and processing part 10 detects failures of the R-LEDs 21 to 26 constituting the red light source part 20, the G-LEDs 31 to 36 constituting the green light source part 30, and the B-LEDs 41 to 46 constituting the blue light source part 40 based on the pieces of LED voltage detection information input from the red light source part 20, the green light source part 30, and the blue light source part 40 through the light source controller 7.

Next, the detection of a failure of an LED by the control and processing part 10 is described. A voltage drop differs among the LEDs depending on a color to be turned on and a current amount thereof. For example, in a case where a voltage drop is 3 to 5 V while the R-LEDs 21 to 26 operate normally, the R voltage detection parts 61 to 66 detect 7 to 9 V. That is, through the setting that the range for judging that the R-LEDs 21 to 26 operate normally is 7 to 9 V, in a case where a voltage beyond the setting range is detected in an LED by the R voltage detection parts 61 to 66, the LED is judged as having failed in a short-circuit condition. Meanwhile, in a case where a voltage below the setting range is detected in an LED by the R voltage detection parts 61 to 66, the LED is judged as having failed in an open condition.

The control and processing part 10 receives an operation signal input from the operation means 12 through the communication part 11, and outputs, based on the operation signal and the detection results on an LED failure by the control and processing part 10, a light source control signal for controlling an LED to the light source controller 7. The R voltage detection parts 61 to 66, the G voltage detection parts, the B voltage detection parts, and the control and processing part 10 correspond to a failure detection part that detects a failure of an LED.

The video display device 3 is formed as, for example, a digital micromirror device (DMD), which modulates, based on the video data input from the signal processing part 9, the light emitted from the red light source part 20, the light emitted from the green light source part 30, and the light emitted from the blue light source part 40 through an on/off process in units of pixels in a time division manner (in other words, sequentially) and projects the modulated light onto the screen 5 through the projection lens 4.

<Operation of Projection Type Video Display>

Figure 4:
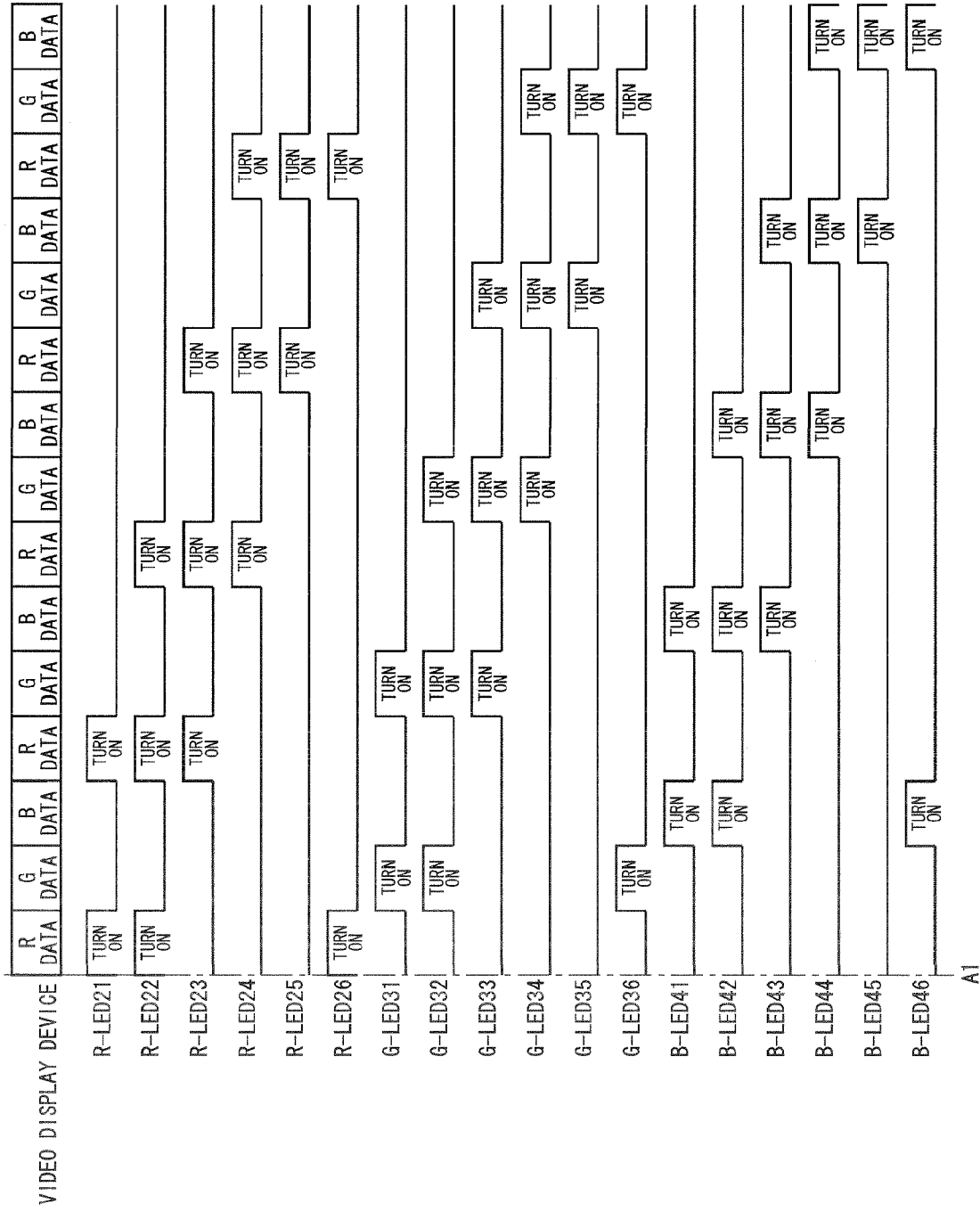
FIG. 4 is a remaining part of the timing chart showing the turn-on timings of the LEDs in the normal state in the power saving mode.

Next, the operation of the projection type video display in a normal state in which a failure does not occur in LEDs constituting the light source parts 20, 30, and 40 is described with reference to FIGS. 3 and 4. FIGS. 3 and 4 are timing charts showing the turn-on timings of LEDs in the normal state in a power saving mode. The timing chart of FIG. 4 is continuous with the timing chart of FIG. 3 at A1.

First, a user sets an operation mode of the projection type video display by means of the operation means 12. The user can set one mode from, for example, a power saving mode, a normal mode, and a brightness prioritized mode as an operation mode. In a case where the user selects the power saving mode, the LEDs of each of the light source parts 20, 30, and 40 are controlled such that only three (more generally, n) LEDs among the six LEDs turn on at the same time.

On this occasion, if only the three LEDs located at predetermined positions in an LED array are turned on, uneven brightness is caused on the screen 5 so that the portion corresponding to the three LEDs turned on becomes bright and the portion corresponding to the three LEDs turned off becomes dark on the screen 5. The light source controller 7 controls three LEDs to turn on in each driving of the time-division driving such that any three LEDs among the six LEDs sequentially rotate in order. Here, intervals in time division are sufficiently short (for example, 1/10 of a video frame), and thus uneven brightness is unrecognizable to the user.

The video display device 3 processes a red (R) image in a red (R) data field, a green (G) image in a green (G) data field, and a blue (B) image in a blue (B) data field, to thereby project a video image onto the screen 5.

Here, one video frame of 60 Hz is composed of ten cycles each composed of the red (R) data field, the green (G) data field, and the blue (B) data field in this order, and the light source parts 20, 30, and 40 are driven to turn on in synchronization with the data fields. Further, in each of the R, G, and B data fields, three LEDs among the six LEDs are sequentially selected and each LED is controlled to turn on three times in six data fields.

Figure 5:
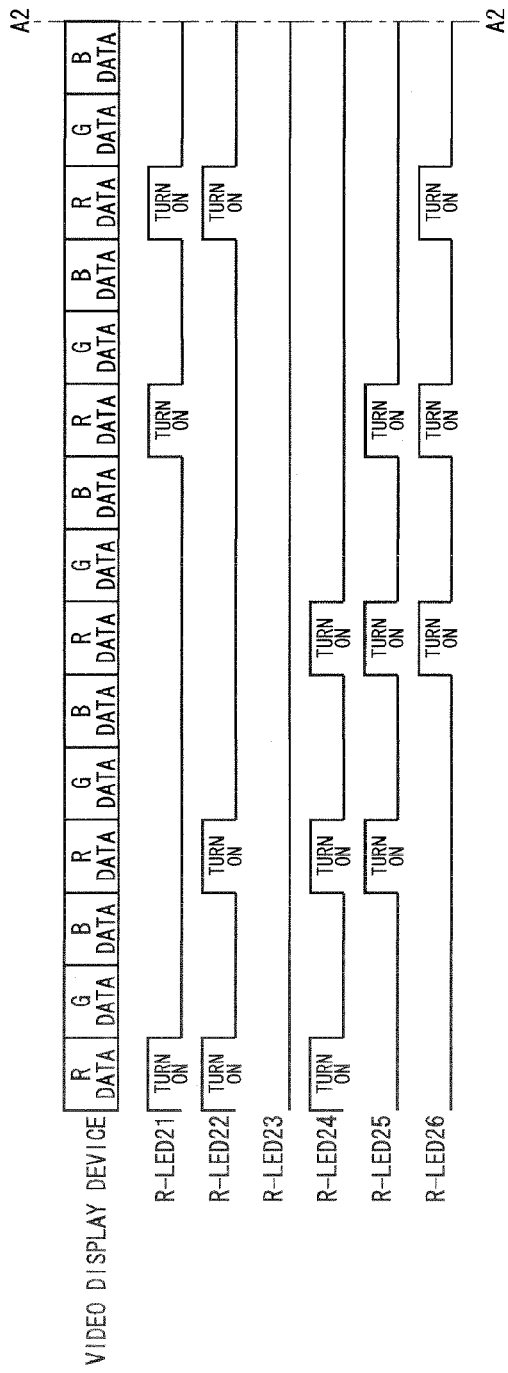
FIG. 5 is a part of a timing chart showing turn-on timings of LEDs in a case where an LED of the red light source part fails in the power saving mode.
Figure 6:
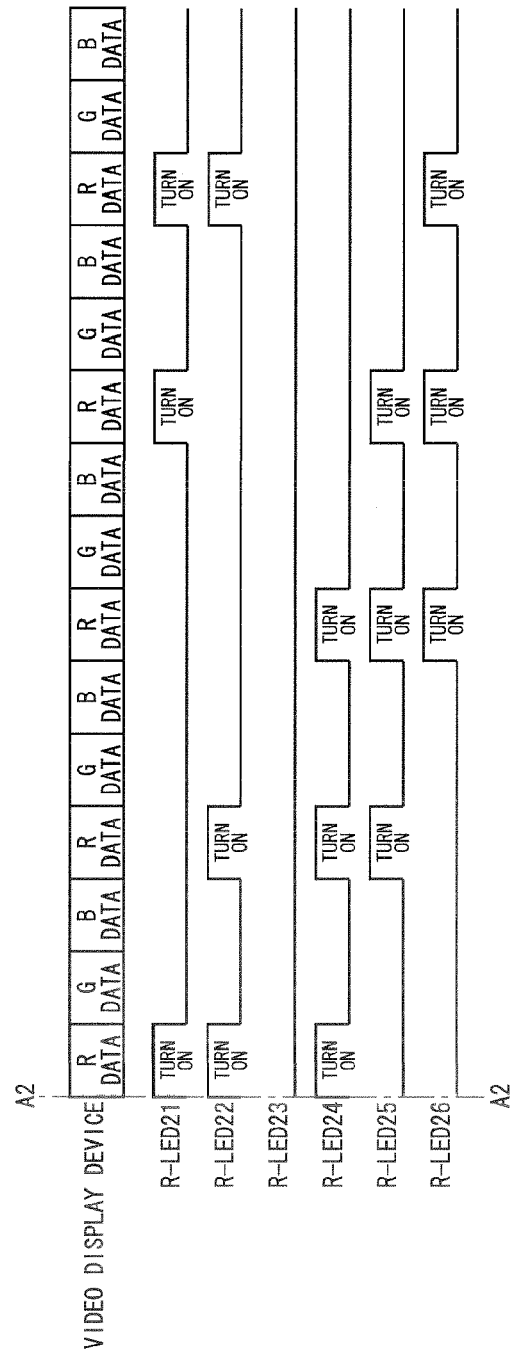
FIG. 6 is a remaining part of the timing chart showing the turn-on timing of the LEDs in the case where the LED of the red light source part fails in the power saving mode.

Next, the operation of the projection type video display in a case of an LED failure is described with reference to FIGS. 5 and 6. Here, the operation in a case where the R-LED 23 of the red light source part 20 fails in a power saving mode is described as an example. FIGS. 5 and 6 are timing charts showing turn-on timings of the LEDs in a case of an LED failure in the red light source part 20. The timing chart of FIG. 6 is continuous with the timing chart of FIG. 5 at A2.

When the control and processing part 10 detects that the R-LED 23 of the red light source part 20 has failed, the light source controller 7 controls the R constant current circuit 53 to stop supplying a drive current to the R-LED 23 based on the detection results. After that, as shown in FIGS. 5 and 6, the timings are shifted such that the five (m-x) R-LEDs 21, 22, 24, 25, and 26 excluding the (more generally, x) R-LED 23 that has failed from the six (m) R-LEDs 21 to 26 sequentially rotate in order in a time division manner without turning on the R-LED 23. The light source controller 7 controls three LEDs to turn on in each driving of the time-division driving such that any three R-LEDs among the five R-LEDs 21, 22, 24, 25, and 26 sequentially rotate in order.

For this reason, the number of LEDs turned on at the same time remain unchanged between before and after an failure of an LED. Among the five normal R-LEDs 21, 22, 24, 25, and 26 excluding the R-LED 23 that has failed, only three R-LEDs are sequentially selected in the R data field and are each controlled to turn on three times such that the R-LEDs 21, 22, 24, 25, and 26 excluding the R-LED 23 that has failed are turned on in five data fields.

The G-LEDs 31 to 36 of the green light source part 30 and the B-LEDs 41 to 46 of the blue light source part 40 have not failed, which is not shown in FIGS. 5 and 6. Accordingly, the G-LEDs 31 to 36 and the B-LEDs 41 to 46 are controlled to turn on in each of the G and B data fields at the timings shown in FIGS. 3 and 4. In a case where a failure is detected in the G-LEDs 31 to 36 of the green light source part 30 and the B-LEDs 41 to 46 of the blue light source part 40, as in the case where a failure is detected in the R-LEDs 21 to 26 of the red light source part 20, the LEDs are controlled as shown in FIGS. 5 and 6.

Figure 7:
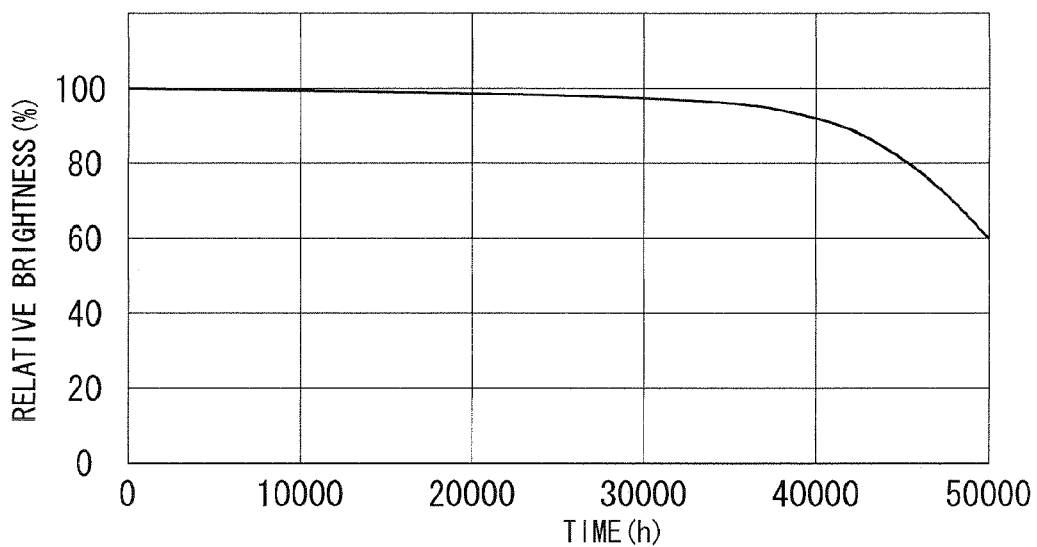
FIG. 7 is a graph showing changes over time in brightness of an LED.

While the brightness of the LED decreases due to changes over time, in a case where only three LEDs located at predetermined positions among the six LEDs are turned on and another LED that has not been turned on is turned on in a failure of an LED, uneven brightness is caused on the LEDs to be turned on. FIG. 7 is a graph showing changes over time in brightness of an LED. As shown in FIG. 7, the brightness of an LED is 60% of the initial brightness after a lapse of 50,000 hours. For example, in a case where an LED fails after a lapse of 50,000 hours and another LED that has not been turned on is turned on, a change in brightness of an LED between before and after the failure is calculated as (60%+60%+100%)+(60%+60%+60%)=1.222 . . . , resulting in an approximately 1.22-times increase in brightness. The approximately 1.22-times brighter red light source part 20 changes the brightness ratio among the red light source part 20, the green light source part 30, and the blue light source part 40 changes. As a result, the chromaticity of a video image to be projected onto the screen 5 changes.

In this preferred embodiment, however, three LEDs are turned on in each driving of the time-division driving before a failure of an LED such that any three LEDs among the six R-LEDs 21 to 26 sequentially rotate in order, and thus, the brightness deteriorates almost equally over time in the six R-LEDs 21 to 26. Therefore, the number of LEDs that are turned on at the same time in the red light source part 20 remains unchanged between before and after a failure of an LED, so that the video display device 3 is capable of projecting a video image onto the screen 5 without a change in brightness. In addition, the brightness ratio among the red light source part 20, the green light source part 30, and the blue light source part 40 remains unchanged, and accordingly, the video display device 3 is capable of projecting a video image onto the screen 5 without a change in chromaticity.

In the normal mode and the brightness prioritized mode, for example, six LEDs constituting each of the light source parts 20, 30, and 40 are variably controlled such that four of them are turned on at the same time and that five of them are turned on at the same time, and are controlled to emit light sequentially in a time division manner as in the power saving mode. The number of LEDs to turn on is variably controlled in this manner, which enables to control the brightness of a video image to be projected onto the screen 5. In this case, the brightness decreases equally over time in all the LEDs constituting the light source parts 20, 30, and 40. Accordingly, for example, uneven brightness of a video image is not caused even in a case where the number of LEDs to turn on at the same time is changed through switching from the brightness prioritized mode to the power saving mode.

Also in a case where the LED of the green light source part 30 or the blue light source part 40 fails, a video image can be projected onto the screen 5 through control performed similarly to the above, without changes in brightness and chromaticity between before and after the failure.

As described above, in the projection type video display according to the preferred embodiment, the light source controller 7 controls only three LEDs among the six LEDs to turn on in each driving of the time-division driving of the light source parts 20, 30, and 40. This enables to keep the number of LEDs to turn on unchanged between before and after a failure of an LED of the light source part 20, 30, and 40. Accordingly, even in a case where an LED of the light source part 20, 30, and 40 fails, changes in chromaticity and brightness of a video image can be suppressed between before and after the failure of the LED.

If LEDs located at predetermined positions in an LED array are turned on, the portion corresponding to the LEDs that are turned on becomes bright and the portion corresponding to the LEDs that are not turned on becomes dark in a video image projected onto the screen 5, which causes uneven brightness in the video image. However, the light source controller 7 controls three LEDs to turn on in each driving of the time-division driving such that any three LEDs among the six LEDs rotate in order, which does not cause uneven brightness of a video image. Moreover, the lives of the light source parts 20, 30, and 40 are expected to become longer.

The LEDs are sequentially turned on in a time division manner, and thus, brightness decreases equally due to the degradation over time in the LEDs. The light source controller 7 variably controls the number of LEDs to turn on, to thereby control the brightness of a video image to be projected onto the screen 5. Accordingly, the brightness decreases uniformly in the LEDs after switching between modes, and uneven brightness of a video image is not caused.

In a case where the failure detecting part detects a failure of an LED, the light source controller 7 controls only three LEDs among the five LEDs excluding one LED that has failed from the six LEDs to turn on, and accordingly, the number of LEDs turned on at the same time remains unchanged between before and after the failure of the LED. Therefore, a video image can be projected onto the screen 5 without a change in brightness. In addition, the brightness ratio among the red light source part 20, the green light source part 30, and the blue light source part 40 remains unchanged, and accordingly, a video image can be projected onto the screen 5 without a change in chromaticity of a video image.

Although in a case where LEDs which have not been turned on are turned after a failure of an LED, uneven brightness is caused in those LEDs, the light source controller 7 controls three LEDs to turn on in each driving of the time-division driving such that any three LEDs among the five LEDs sequentially rotate in order. Accordingly, the brightness decreases uniformly in the LEDs due to the degradation over time, and changes in chromaticity and brightness can be suppressed in a case of a failure of an LED.

The present invention is particularly effective in a multivision projection type video display formed through the combination of projection type video displays. In the multivision projection type video display, the decrease of brightness and a change of chromaticity in a projection type video display impair the unity of screens and the natural connection of screens. According to the present invention, the above-mentioned operation is performed also in a case of a failure of an LED in one or a plurality of projection type video displays constituting a multivision projection type video display, whereby the brightness and chromaticity remain unchanged between before and after a failure. Therefore, the unity of screens and natural connection of screens in a multivision projection type video display are not impaired.

While the light source parts 20, 30, and 40 are each composed of six LEDs in this preferred embodiment, the number of LEDs is not limited to six. Also, while a constant current circuit is provided for each of six LEDs in the preferred embodiment, LEDs may be divided into groups such that one constant current circuit drives a plurality of LEDs and controls the turn-on timing for each group.

While the invention has been shown and described in detail, the foregoing description is in all aspects illustrative and not restrictive. It is therefore understood that numerous modifications and variations can be devised without departing from the scope of the invention.

What is claimed is:

1. A projection video display, comprising:
    a light source including LED arrays for a plurality of predetermined colors; the LED arrays each including m (m is an integer equal to or larger than two) LEDs;
    a light source controller time-division driving each of said LED arrays at a timing based on an input video signal; and
    a video display device modulating the light emitted from each of said LED arrays based on said input video signal and projecting the modulated light onto a screen,
    wherein said light source controller controls only n (n is an integer smaller than m) LEDs among said m LEDs, each of said n LEDs being individually controlled to turn on in each driving of said time-division driving of each of said LED arrays, and further comprising a failure detection part detecting a failure of an LED,
    wherein upon detection of a failure of said LED by said failure detection part, said light source controller controls only said n LEDs among (m−x) LEDs excluding x (x is an integer smaller than m) LEDs that has failed from said m LEDs to turn on, and
    wherein said light source controller controls said n LEDs to turn on in each driving of said time-division driving such that said n LEDs among said (m-x) LEDs sequentially rotate in order.

2. The projection video display according to claim 1, wherein said light source controller variably controls the number of said n LEDs to control the brightness of a video image to be projected onto said screen.

* * * * *